United States Patent [19]

Schmalfuss et al.

[11] Patent Number: 4,798,964
[45] Date of Patent: Jan. 17, 1989

[54] METHOD AND APPARATUS FOR THE CONTACTLESS MEASURING OF THE TREAD QUALITY OF RAILROAD

[75] Inventors: Harald Schmalfuss, Rodgau; Friedel Sinsel, Frankfurt; Hubertus Kurpiella, Eschborn, all of Fed. Rep. of Germany

[73] Assignee: Wilhelm Hegenscheidt Gesellschaft mbH, Erkelenz, Fed. Rep. of Germany

[21] Appl. No.: 893,160

[22] Filed: Aug. 4, 1986

[30] Foreign Application Priority Data

Aug. 12, 1985 [DE] Fed. Rep. of Germany ....... 3528873
Mar. 24, 1986 [EP] European Pat. Off. ......... 86104027.7

[51] Int. Cl.$^4$ ............................................... G01V 9/04
[52] U.S. Cl. ..................................... 250/560; 356/376
[58] Field of Search .................. 250/560, 224; 356/4, 356/384, 385, 386, 387, 376, 1; 364/561, 562, 563

[56] References Cited

U.S. PATENT DOCUMENTS

| | | | |
|---|---|---|---|
| 4,040,738 | 8/1977 | Wagner | 356/4 |
| 4,125,317 | 11/1978 | Gordon et al. | 356/376 |
| 4,531,837 | 7/1985 | Panetti | 356/376 |
| 4,674,869 | 6/1987 | Pryor et al. | 356/376 |
| 4,678,920 | 7/1987 | Iadipaolo et al. | 356/376 |
| 4,679,447 | 7/1987 | Sieradzki et al. | 356/376 |

OTHER PUBLICATIONS

"Quality Control by an Automated Visual Inspection", an article published in special print from vol. 20, Messen und Pruefen (Measuring and Testing), 1984, Nr. 6.

Primary Examiner—David C. Nelms
Assistant Examiner—Jessica Ruoff
Attorney, Agent, or Firm—W. G. Fasse; D. H. Kane, Jr.

[57] ABSTRACT

The quality of the tread of profile of railroad wheels is measured in a contactless manner by illuminating the circumferential wheel surface with a light or radiation source directing its radiation at least approximately in a radial direction onto the wheel surface to form a light intersection image or a light edge image of the wheel profile or tread. A sensor or sensors such as cameras, scan or sense these images by receiving light reflected by the wheel surface to produce analog signals representing the quality of tread or profile. These analog signals are digitized and supplied to a central processing unit for evaluation to provide information regarding the wheel quality. The illuminating and sensing can be performed while the wheel or wheel set is stationary or while it rolls through a measuring station, whereby it is not even necessary to remove a wheel from its vehicle for inspection.

34 Claims, 9 Drawing Sheets

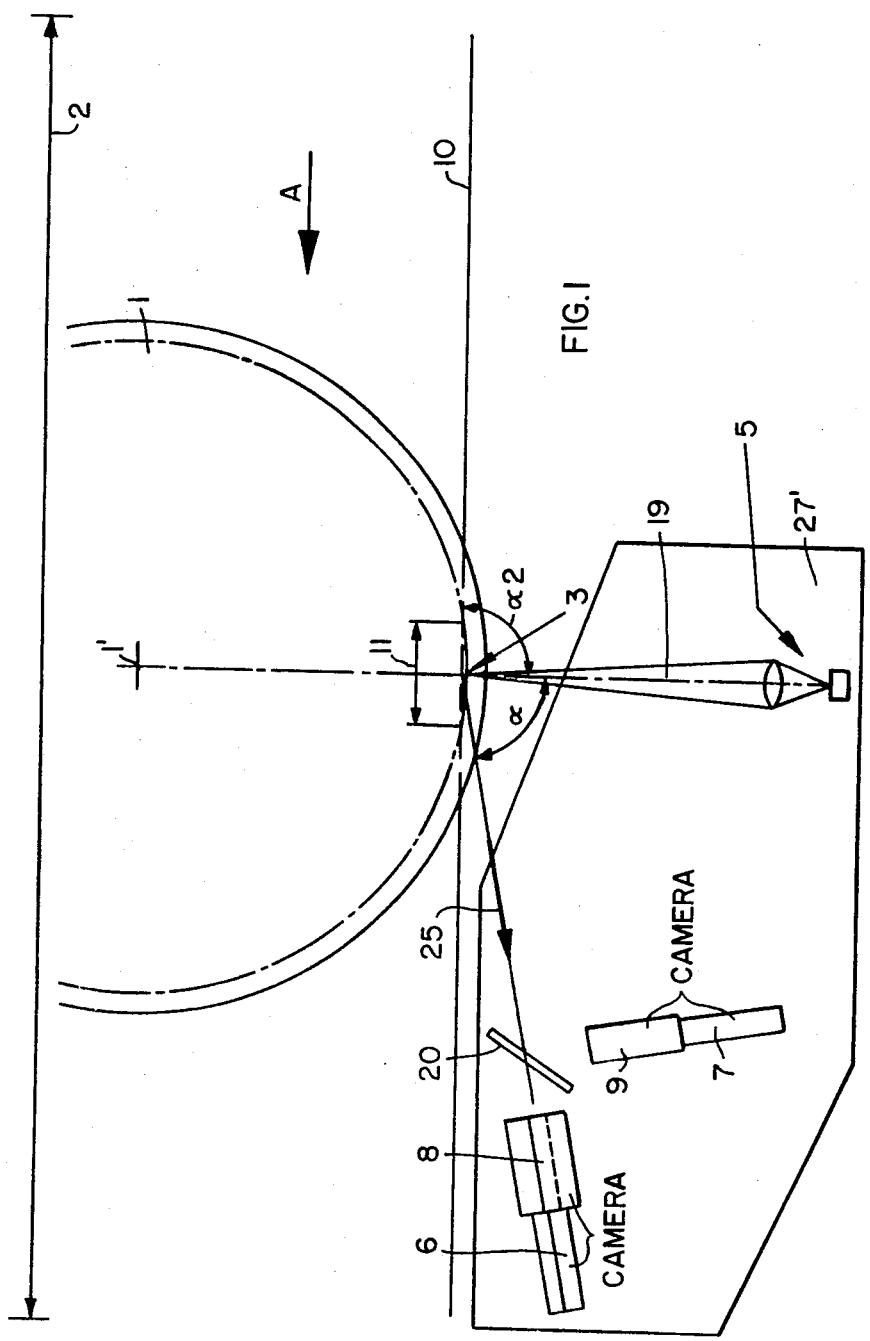

METHOD AND APPARATUS FOR THE CONTACTLESS MEASURING OF THE TREAD QUALITY OF RAILROAD

CROSS-REFERENCE TO RELATED APPLICATION

The present application relates to U.S. Ser. No. 893,365, filed in the U.S.A. on Aug. 4, 1986, entitled: "APPARATUS FOR MONITORING AND MEASURING THE QUALITY OF RAIL WHEELS", and also relates to U.S. Ser. No. 876,266, filed in the U.S.A. on June 19, 1986, entitled: "METHOD AND APPARATUS FOR MEASURING THE DIAMETER OF WHEELS, ESPECIALLY RAILROAD WHEEL SETS". cl FIELD OF THE INVENTION The invention relates to a method and to an apparatus for the contactless measuring of railroad wheels. More specifically, the invention aims to measure the quality of the wheel tread or profile of a wheel or wheel set that is still attached to a vehicle moving along a measuring range.

DESCRIPTION OF THE PRIOR ART

Methods and devices for measuring the quality of a wheel tread employing an illumination of the profile or tread are known in the art as so-called optical measuring stations. Such optical measuring stations have performed satisfactory, however, they require that the wheel or wheel set is removed from the vehicle for ascertaining the wheel tread or wheel profile quality. The wheel or wheel set must be transported to the measuring station, lifted, and then held in place between two axially aligned centering points. The wheel circumferential surface is then illuminated by a plane parallel light beam extending tangentially to the wheel surface for producing a shadow image of the wheel profile or wheel tread. The resulting image, or rather profile line, is then compared with a standard or reference profile line for ascertaining any differences between the actually measured wheel profile and the standard or reference wheel profile. These differences are a measure of the tread quality so that the differences may be used for evaluating the quality of the wheel profile or tread. These prior art devices are located in wheel truing workshops and therefore these stations cannot be used for a periodical, routine, automatic testing of wheel or wheel sets still attached to a rail vehicle.

Illuminating devices for producing a light intersection or a light edge of an illuminated surface are known in the art and it is also known to sense or scan the respective surface or profile image by a camera, the output signals of which are then evaluated. Reference is made in this connection to an article entitled "Quality Control By An Automated Visual Inspection", published in the Periodical "Messen und Pruefen" (Measuring and Testing), special print from Volume 20, 1984, Nr. 6. However, all these prior art devices for illuminating and scanning a wheel surface must remain stationary in order to measure the respective stationary objects such as a wheel. A linear, long work piece had to be scanned along its longitudinal extension at different locations to ascertain the quality of the profile extending perpendicularly to the longitudinal axis of the work piece. Thus, the work piece had to be stepped and then stopped again for the testing repeatedly.

OBJECTS OF THE INVENTION

In view of the foregoing it is the aim of the invention to achieve the following objects singly or in combination:

to provide a method for measuring railroad wheels at least as far as their wheel profile or tread is concerned in an automatic manner to provide an output information which at least tells whether the wheel quality is acceptable or unacceptable;

in case the output information indicates that a wheel is unacceptable, the respective data representing the unacceptability must provide control signals for a subsequent truing of the respective wheel;

to perform the wheel measurements regardless whether the wheel is removed from a railroad vehicle or whether it is still attached to a railroad vehicle; and to provide an apparatus for performing the above mentioned automatic measuring steps and to provide a correction output signal for a truing machine.

SUMMARY OF THE INVENTION

According to the method of the invention the wheel tread quality is measured in that each wheel is illuminated in an approximately radial direction by at least one illuminating device such as a laser beam generator for producing a light section image of the circumferential tread surface of the wheel, whereby the respective image extends in parallel to the wheel axle. The Light reflected by the wheel tread surface is sensed by at least one sensing device such as a light sensitive camera for scanning the profile image resulting from the illumination. The initially scanned camera signals are digitized and supplied to a central data processing unit for evaluation to provide the above mentioned output information including correction signals if a wheel has been found to be unacceptable in its tread quality as compared to a standard wheel tread serving as a reference tread surface.

The invention makes it possible to measure the profile or tread of each wheel of a wheel set regardless whether the wheels are still secured to a rail vehicle and even while the rail vehicle is still moving along a railroad track. Where it is more convenient to have the wheel set removed the present method and apparatus may also be used when the wheel or wheel set is suspended for rotation between two centering pins. Even the diameter may be measured at least when the wheel or wheel set is suspended between two centering pins. The measurements performed according to the invention also provide information regarding the lateral position of two wheel profiles relative to each other. Thus, it is now also possible to measure the lateral spacing between two wheels forming a wheel set.

The apparatus according to the invention for measuring the tread quality of the wheel profile or tread of one railroad wheel comprises an illuminating device which irradiates the surface of a wheel at least partially to forming a light section image. The apparatus comprises means for carrying the wheel and optical means for producing said light section image of the circumferential surface of the wheel to be measured. The illuminating device with its optical means is located at a suitable radial distance from the circumferential tread surface of the wheel. At least one sensor or scanner, for example in the form of a charge coupled device, is located in a position to receive light reflected by the wheel surface. A digitizing device such as a conventional analog- to-digital converter receives the output signals of the camera to provide digitized signals representing information regarding the wheel tread quality. A central processing unit in the form of a known computer receives the digitized output signals from the camera for evaluation and producing the respective information signals, for example, in the form of a printout or on a display screen, or in the form of a control tape that may then be used for controlling a truing machine for restoring the tread quality. The digitizing ability may be inherent in the camera Preferably, the direction of the illuminating beam and the direction of the reflected beam enclose an angle within the range of about 60° to about 90°. Further, means are preferably provided for positioning the illuminating device and/or the scanning camera relative to the circumferential surface of a wheel.

These features make it possible to bring the measuring components such as the light source and the camera and the object to be measured into the correct position relative to one another and to hold the elements in that position at least when a measurement is taken. The camera itself may comprise an array of semiconductor light sensors forming a sensor plate which receives the light and provides a digitized output for the central processing unit. The suitable radial spacing between the measuring components and the wheel circumferential surface is determined by the requirement that the intersection between the illuminating light beam and the reflected light beam must be located on the wheel circumferential surface. However, this radial spacing is not too critical since it may vary within a range which will still permit obtaining a sufficient analog image of the wheel profile or tread.

BRIEF DESCRIPTION OF THE DRAWINGS

In order that the invention may be clearly understood, it will now be described, by way of example, with reference to the accompanying drawings, wherein:

FIG. 1 is a schematic side view of an apparatus according to the invention;

FIG. 7 is a schematic side view of one half of a wheel truing lathe including centering pins for holding a wheel set and.

DETAILED DESCRIPTION OF PREFERRED EXAMPLE EMBODIMENTS AND OF THE BEST MODE OF THE INVENTION

Figure 1A:
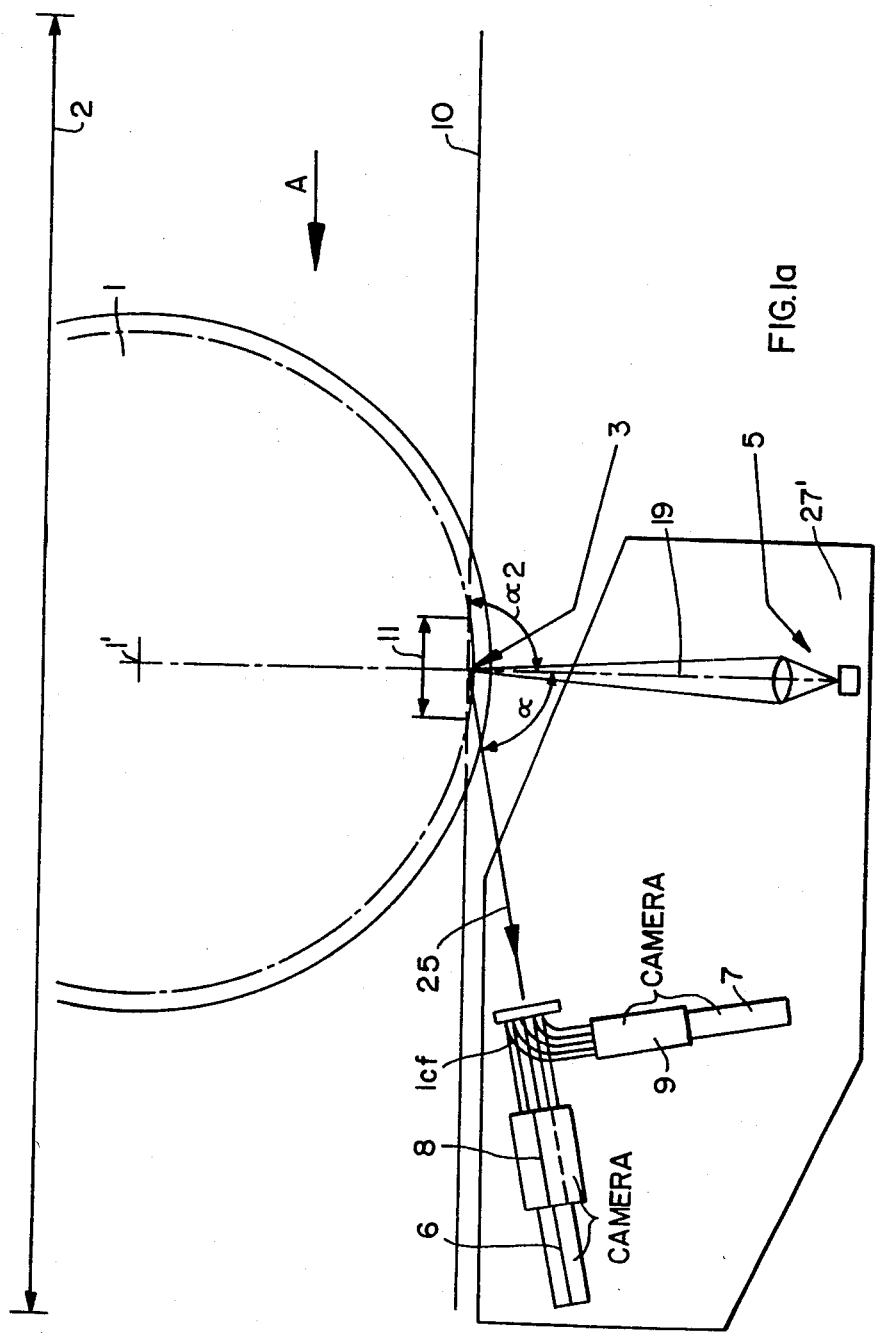
FIG. 1a is a view similar to that of FIG. 1, but showing the use of light conducting fibers for supplying the reflected light to different sets of cameras.

FIG. 1 shows a railroad wheel 1 within a measuring range 2 of defined length along a rail surface 10 on which the wheel 1 rolls. The rolling surface 10 is formed by an auxiliary rail 15 installed as part of a track section, please see FIG. 4. The wheel 1 is part of a wheel set that may be installed in any rail vehicle including a driving vehicle such as a locomotive. During measurements the wheel moves slowly from left to right through the measuring range 2.

A carrier 27' such as a vertically extending mounting plate is located below the plane 10. The mounting plate 27' carries, for example, four cameras for each wheel of a wheel set. A total of eight cameras is shown schematically in FIG. 3. Cameras L1, L2, L3, and L4 are provided for one wheel of a set. Cameras R1, R2, R3, and R4 are provided for the other wheel of a wheel set. All cameras may be charge coupled devices. These cameras are shown symbolically at 6, 7, 8, and 9 in FIG. 1. Cameras 6 and 8 form one group. Cameras 7 and 9 form another group. As viewed in FIG. 1, the cameras are located to the left of a measuring plane defined by the direction 19 of a light beam radially directed onto the wheel circumferential tread surface at a point 3 located in the direction 19 which passes also through the center 1' of the wheel 1. Thus, the rotational axis of the wheel 1 passing through the wheel center 1' and the light direction 19 are located in the plane passing through the point 3 which is the measuring point. Each camera 6, 7, 8, and 9 comprises imaging optical means for the recited light and a sensor plate of charge coupled devices operating to digitize the analog incoming light signal so that the camera output signals are digital signals representing the quality of the wheel profile or tread surface.

Figure 4:
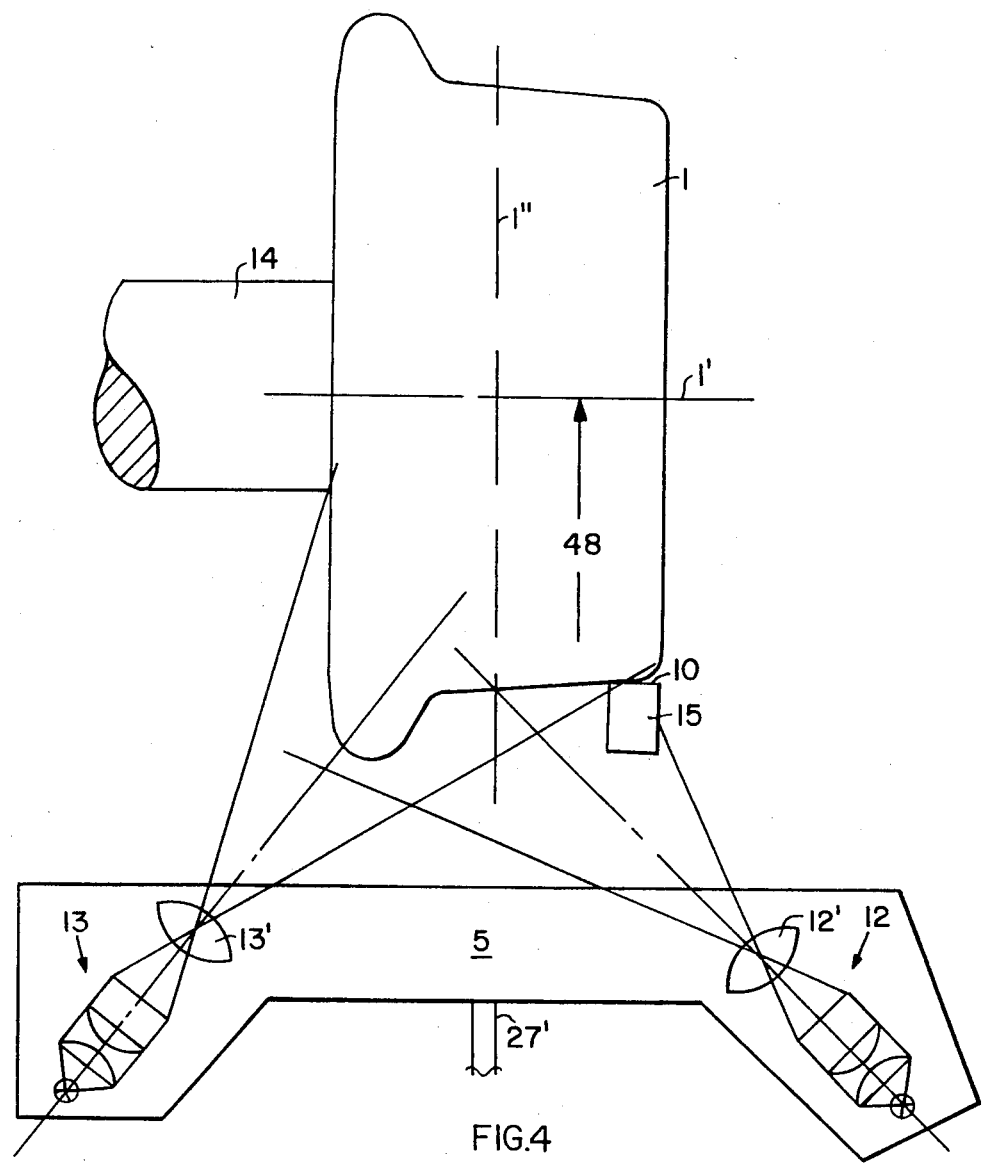
FIG. 4 is a view in the direction of the arrow A in FIG. 1, but FIG. 1 does not need to use two light sources.

A light source 5, such as a laser beam generator mounted on the plate 27', comprises two individual light source elements 12 and 13 with their respective optical elements 12' and 13' as best seen in FIG. 4. The light source elements 12 and 13 are displaced to the right and left of a vertical plane 1" extending centrally through the wheel and perpendicularly to the wheel center or axis 1' as shown in FIG. 4. The light source elements 12 and 13 with their respective optical lenses 12' and 13' are so arranged that the light beams 19 produce a light section image of the tread of the wheel 1. The formation of a light section image edge is well known and does not require any further explanation. By arranging the two light source elements as shown in FIG. 4 it is assured that shadow effects that may, for example, the caused by the wheel flange or by the auxiliary rail 15 providing the rolling surface 10, are prevented.

The cameras 6, 7, 8, and 9 are located, as mentioned, below the moving or rolling plane 10 so that the cameras do not hinder or interfere with the rolling of a wheel through the measuring range 2. Where only a single light source is used it will be located as shown in FIG. 1 vertically below the measuring point 3 and the center 1', thereby forming an angle $\alpha 2$ of 90° between the rolling plane 10 and the light direction 19. The light reflected direction 25 encloses with the illuminating direction 19, an angle $\alpha$, whereby the cameras 6 and 8 are so arranged that they receive the reflected light through a beam splitter 20 passing part of the reflected light to the cameras 6 and 8 and a deflecting part of the light to the cameras 7 and 9. The angle $\alpha$ should be within the range of about 60° to about 90°. If this arrangement of the cameras should result in a distortion of the wheel profile, it is easy to compensate for such distortion in the central processing unit. The use of more than two cameras arranged as shown in FIG. 1 has the advantage that a higher resolution is achieved. The mentioned beam splitter 20 may, for example, be a semipermeable mirror. However, light conductor fibers may also be used to supply all cameras with the reflected light, whereby the number of cameras may be increased.

To provide signals which are as accurate as possible with the aid of the cameras 6 to 9, it is necessary that the measuring point or position 3 coincides as accurately as possible with the respective profile image. Thus, the measuring position should be sensed for providing a respective signal that will trigger the light source 5 and the cameras 6 to 9. A simple rail switch triggered by the wheel 1 passing over the rail switch could be used for this purpose. Conventionally available rail switches have a sufficiently small tolerance for the present purposes,. The switches may operate mechanically or electromagnetically. Optically operating switches are also available for this purpose. When the measuring position sensing switch is activated by a wheel, it triggers the light source 5 for emitting an illuminating strobe light. The cameras 6 to 9 are activated simultaneously for taking the respective and for supplying the corresponding digital signals to the central processing unit.

Figure 2:
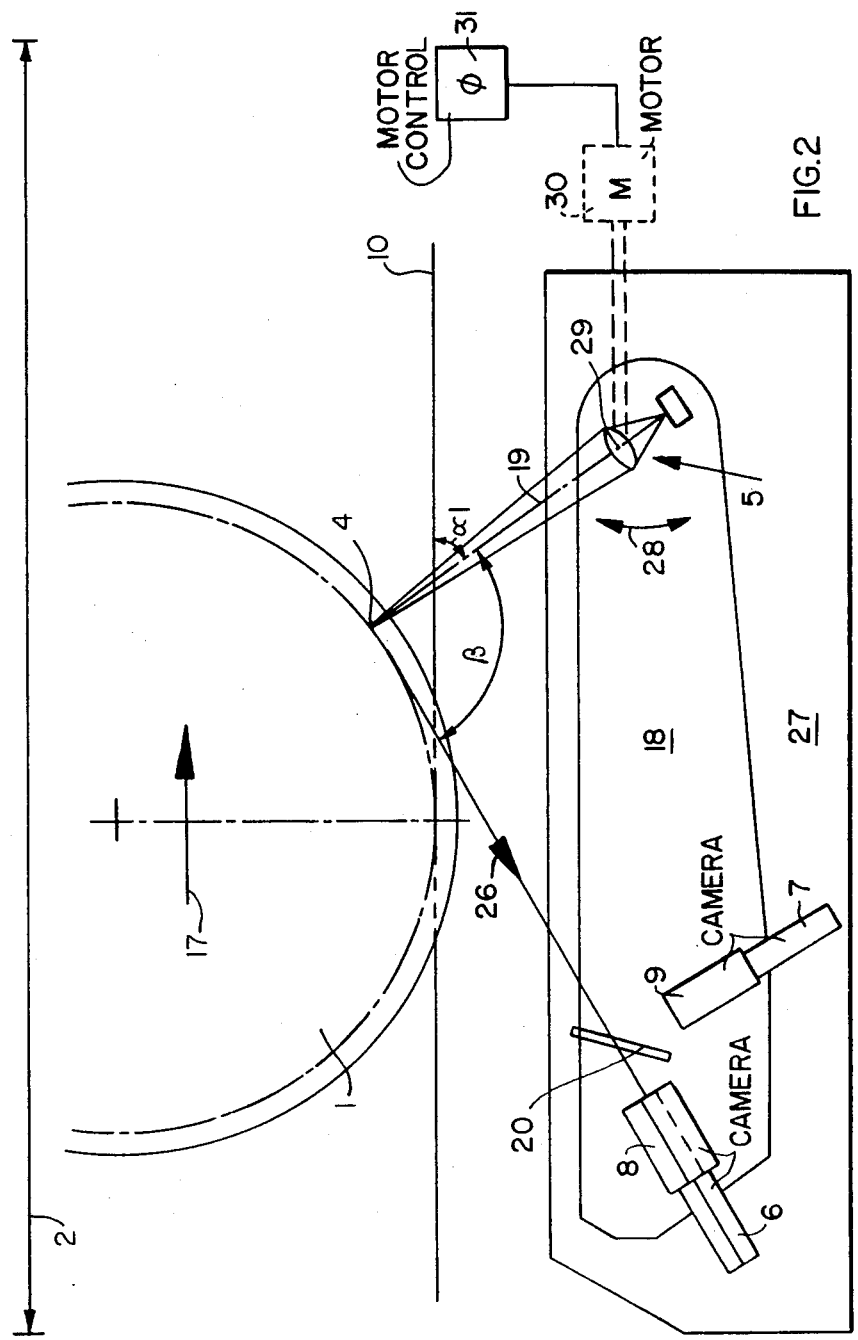
FIG. 2 is a view similar to that of FIG. 1 but showing a modified embodiment of an apparatus according to the invention.

FIG. 2 illustrates an embodiment in which the measuring position or zone 4 can be enlarged by a somewhat different disposition of the cameras and light source as compared to FIG. 1. The arrangement of FIG. 2 simultaneously avoids an image distortion and hence does not need any distortion compensating circuits in the central processing unit. The light direction 19 and the reflected light direction 26 in FIG. 2 enclose an angle $\beta$ which may be smaller than 90°, whereby the light direction 19 encloses with the rolling plane 10 an acute angle $\alpha 1$. As long as the angle $\alpha 1$ is acute, it remains possible to keep the cameras 6 to 9 below the rolling plane 10 on which the wheel 1 rolls in the direction of the arrow 17 as shown in FIG. 2. However, the rolling direction is not critical. The arrangement could be such that the wheel rolls in a direction opposite to that of the arrow 17.

In the embodiment of FIG. 2 it is also necessary that the light beam direction 19 extends radially relative to the measuring point 4 and to the center of the wheel 1. Therefore the inclination of the light beam direction 19 must be variable as a function of the diameter of the wheel to be measured. Simultaneously, the position of the cameras 6 to 9 must be variable accordingly. In order to achieve the required position adjustment of the light source 5 and the cameras 6 to 9, these components are mounted on an adjustable support 18 which in turn is tiltable about a pivot 29 in the direction of the arrow 28 relative to the mounting plate 27 to which the support 18 is pivotally connected. The tilting of the support 18 is accomplished by a motor 30 which is responsive in its operation to a control mechanism 31 which may receive the diameter of an oncoming wheel, for example, by manually operable input keys or it may receive a signal from a diameter measuring device as is disclosed in more detail, for example, in the above mentioned copending application U. S. Ser. No. 876,266 filed on June 19, 1986. The diameter measuring device may also be located in or upstream of the measuring range 2.

In the embodiment of FIG. 1 it is also possible to increase the size or surface area of the measuring point 3 to that of a measuring zone 11 by taking several pictures in rapid succession. If in this instance the cameras 6 to 9 are located on one side of the direction or plane 19, the respective camera signals may provide in the computer a wheel tread surface which first rises and thereafter possibly decreases. Since the speed at which the successive pictures or images are taken, is known, and since it is further known that the wheel 1 has a circular wheel tread surface moving along the measuring range 2 either in a sliding or rolling motion, it is also known how the image of the wheel tread surface to be expected rises. That image of the wheel tread surface may initially be distorted. In this type of arrangement it is further possible to make certain whether an a picture was taken at the exact peak point, or whether pictures were taken just prior to and just after the peak point. If the picture of the image was taken just prior to the peak point, the resulting signal can be directly evaluated. If the picture was taken just after the peak point, the computer must perform a correction.

The embodiment of FIG. 1 may be further modified by providing sets or groups of cameras on both sides of the plane defined by the light direction 19. The respective cameras corresponding to cameras 6, 7, 8, and 9 would be arranged mirror-symmetrically on the right-hand side of the plane defined by the light direction 19 and relative to the cameras 6 to 9 shown in FIG. 1. Several pictures or images of the measuring zone 11 would then be taken in rapid succession and the respective signals would arrive in the central processing unit as two different tread contours moving toward each other from opposite directions. If all cameras happen to take a picture of the measuring point 3, the computer will provide tread contours that are congruent to one another because both camera systems provide an identical tread contour. This congruent tread contour represents the one that needs to be measured. If no coincidence or congruence is achieved, the central processing unit can interpolate between two contours that are closest to each other. Although this modification of FIG. 1 requires additional cameras, the required software in the central processing unit remains substantially the same because it is no longer necessary to take into account the contour displacement that may be expected as a function of the wheel diameter and as a function of the time spacings between adjacent images in an image sequence.

In order to achieve a sufficiently rapid image taking sequence, several sets of cameras could take pictures alternately in sequence. According to another possibility a rapid sequence multiple exposure could be performed provided a light intersection illumination is employed and provided these multiple exposures are done prior to transferring the camera signals to the central processing unit.

Figure 5:
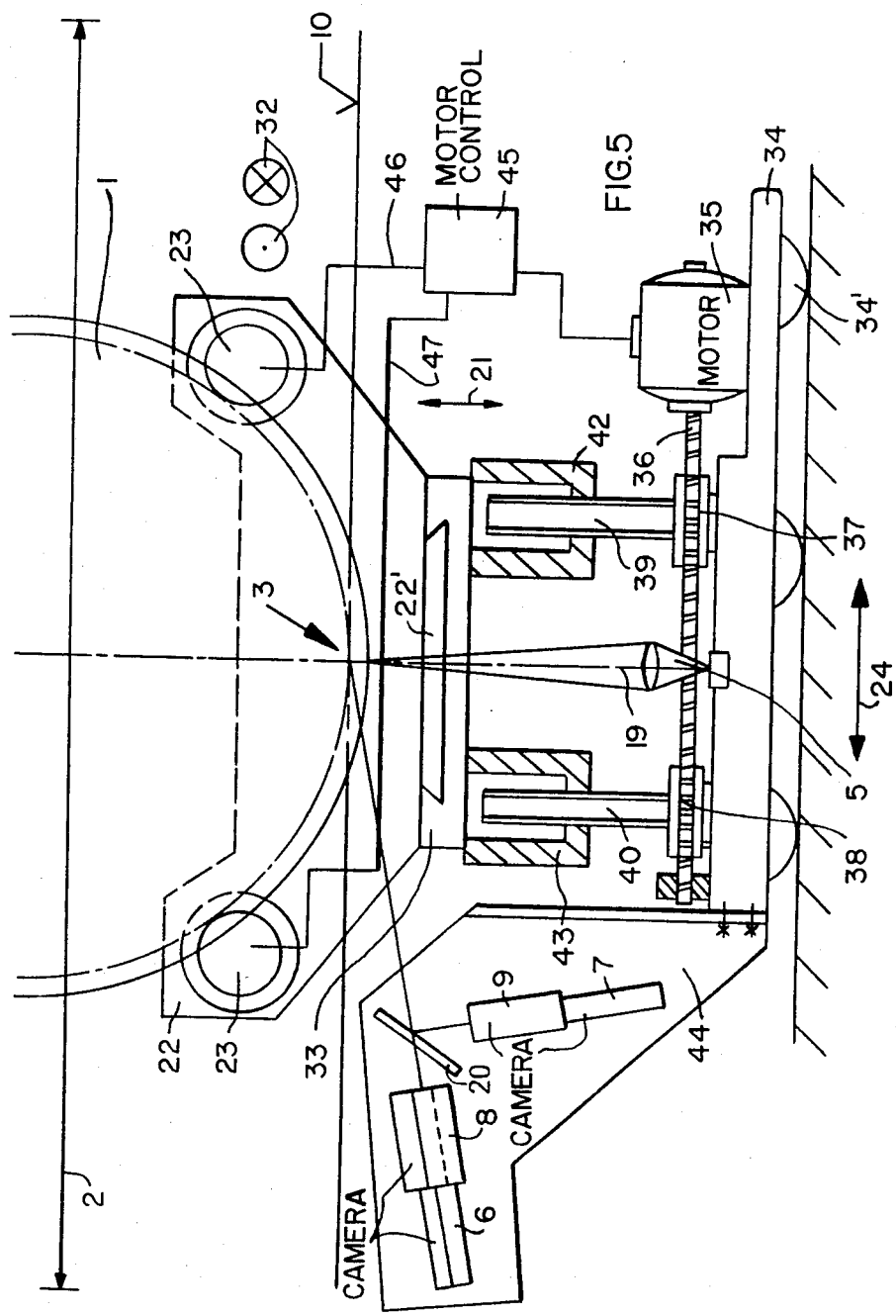
FIG. 5 is a side view of a further embodiment of the apparatus according to the invention including means for properly centering or adjusting the position of a wheel relative to a camera and relative to an illuminating device.

FIG. 5 illustrates an embodiment which assures that the measuring or light exposure takes place as precisely as possible when the measuring position 3 coincides with the measuring direction 19. A support roller carrier 2 carrying wheel support rollers 23 for the wheel 1 is arranged laterally and alongside the auxiliary rail 15. The rollers 23 are rotatably supported by the carrier 22 which in turn is supported in a slide 33 relative to which the carrier 22 is movable, for example, with the aid of a prism mounting 22' in a direction back and forth perpendicularly to the plane of the drawing as indicated at 32. A carriage 34 with wheels 34' is movable in parallel to the movement plane 10 as indicated by the arrow 24. The carriage 34 supports the slide 33 and a motor 35 for moving the slide vertically up and down as indicated by the arrow 21. The motor 35 drives a spindle 36 which in turn drives worm gears 37, 38, 39, and 40 engaging threaded nuts 42 and 43 of the slide 33 for the vertical up and down movement of the slide 33 relative to the carriage 34. By raising or lowering the slide 33 the roller carrier 22 is respectively raised or lowered depending on the diameter of a wheel cradled by the rollers 23. The illuminating device 5 is also mounted on the carriage 34 for illuminating the circumferential surface of the wheel 1 either directly or through a deflecting mirror. If necessary, a gap is provided in the auxiliary rail 15 for the light beam to pass through in the direction 19 for illuminating the wheel from below. The carriage 34 further supports a mounting plate 44 which in turn carries the cameras 6, 7, 8, and 9. The beam splitter device 20 is also supported on the mounting plate 44. The arrangement is the same as shown in FIG. 1 as far as the cameras and light source are concerned.

The apparatus of FIG. 5 operates as follows. First, the slide 33 is moved in a direction perpendicularly to the plane of the drawing toward a wheel slowly rolling through the measuring range 2. The slide 33 is moved until the pair of support rollers 23 comes close to the circumferential wheel surface or to the wheel flange. Thereafter, the motor 35 is operated to lift the carrier 22 and thus the support rollers 23 until these rollers contact the circumferential surface of the wheel 1. The fact that the rollers 23 have contacted the wheel surface may be sensed, for example, by strain gages connected to the rollers 23 and further connected through electrical conductors 46 and 47 to a motor control circuit 45.

The motor control circuit 45 then switches the motor 35 off. When the wheel rests in the cradle formed by the rollers 23, the entire apparatus may roll along with the moving wheel because the carriage 34 is also provided with wheels 34'. The entire illumination and picture taking takes place while the carriage 34 moves along with the wheel. When this operation is completed, the support roller carrier 22 is lowered again and the slide 33 is moved out of contact with the wheel. Thereafter, the entire carriage 34 and the components mounted thereon may be returned into a starting position for cooperation with the next wheel. Several carriages with their respective equipment may be located in a measuring range 2.

Figure 7:
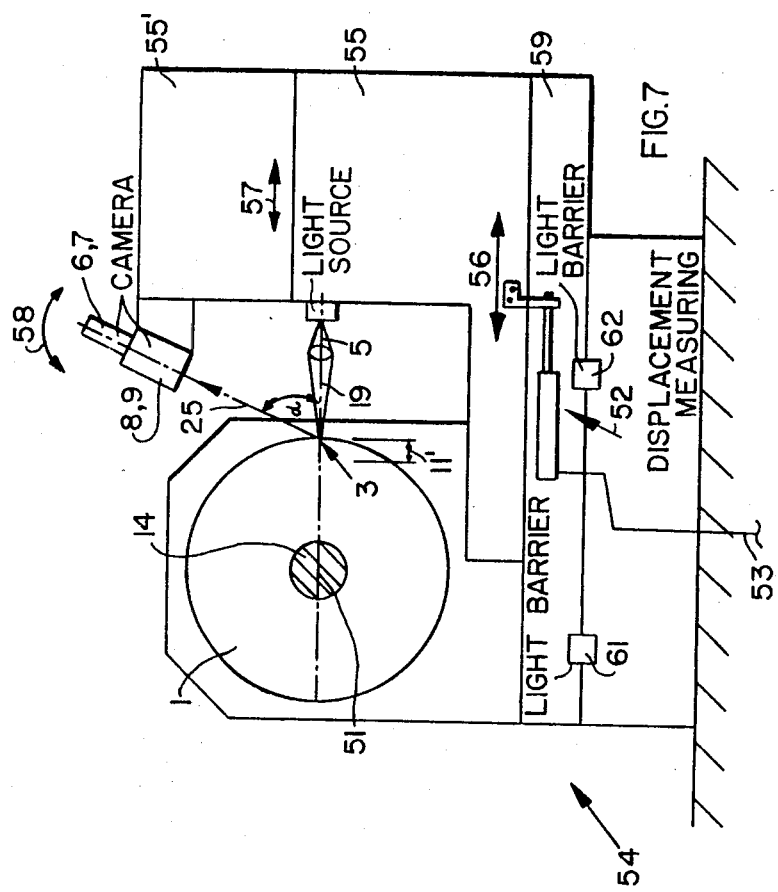

As shown in FIG. 7, the present apparatus may also be incorporated in a railroad wheel truing machine 54 or in a wheel diameter measuring machine. A wheel 1 or a wheel set 1 is held in place by centering points holding the wheel axle 14 axially in place and permitting the rotation of the wheel 1. A support 55 is slideable back and forth on a machine bed 59 as indicated by the arrow 56. The support 55 carries part of a distance or displacement measuring device 52 of conventional construction which cooperates with a respective sensor forming part of the fixed machine bed 59 so that the displacement of the support 55 relative to the machine bed 59 may be measured. The displacement measuring device 52 then provides an output signal representing the displacement distance at an output 53. A light generator 5 is mounted on the support 55 for illuminating the measuring spot 3 on the wheel 1 in the direction 19 which again extends radially to the wheel 1. The light source 5 produces a light section or a light edge parallel to the rotational axis of the wheel set axis 14. The illumination produces reflected light in the direction 25 toward the cameras 6 to 9 which are adjustable in their position as indicated by the arrow 58. Here again, the illuminating direction 19 and the reflection direction 25 enclose an angle α as described above. The cameras 6 to 9 produce digitized signals which are processed also as described above in the circuit of FIG. 3.

In addition to the tilting adjustment indicated by the arrow 58 or instead of this tilting adjustment, the camera position may be further controlled by making the camera mounting member 55' movable relative to the support 55 as indicated by the arrow 57. Thus, the angle α and accordingly the direction of the reflected light α may be modified so that the measuring spot 3 is exactly ascertained. If the measuring spot is located exactly at the intersection of the directions 19 and 25, as shown in FIG. 7, the respective image is produced in the imaging plane of the cameras 6 and 7. In other words, the location of the profile image, that is of the spot 3, is exactly determined by the imaging plane in the cameras 6 and 7. Similarly, a measuring zone 11' can be exactly determined because the imaging plane of the cameras is determined in its position. The camera position and the position of the illuminating source 5 is known and the distance measuring device 52 can ascertain the displacement of the support 55 relative to a fixed point, for example the defined position 51. Therefore, these data may be used to calculate the diameter of the wheel 1. Such calculation is possible based on the measurements by the displacement measuring device 52 because one part of this displacement measuring device is movable with the support 55 and the other part is secured to the stationary machine bed 59. The just described features make it possible to measure the wheel diameter as well as to ascertain the quality of the wheel profile or tread and to use the resulting signals for the control of a wheel truing machine to provide for a fully automatic truing operation. After completion of the wheel truing, the wheel may again be measured to make sure that the corrected wheel satisfies the permissible tolerance requirements for the wheel tread.

Light barriers 61, 62 may be used to limit the displacement range of the support 55 relative to the machine bed 59 for positioning the illuminating source 5. Similarly, light barriers not shown may be used for positioning the cameras 6 to 9. A fixed point on the camera imaging plane may be used for the positioning of the cameras as a reference point.

Incidentally, the imaging plane of each camera comprises a sensor plate capable of digitizing the sensed analog light reflected by the wheel surface. This sensor plate is completely filled with picture elements or so-called pixels arranged in rows and columns to form a matrix. Each pixel is capable of reacting to light or light of a certain frequency or intensity to thereby change its switching status. The position adjustment takes place by opening the imaging optic of the cameras or of one camera while moving the camera or camera into the desired position and switching on the illuminating source 5. During this operation a tread image of the wheel travels from a marginal position into the imaging plane of the camera defined by the pixel matrix. During this movement the switching conditions of certain pixels lying in the adjustment path so to speak is changed. However, this change can be ignored by the central processing until a certain, defined pixel also changes its switching state. Thus, the central processing unit can be activated when a pixel located, for example in the center of the imaging plane, changes its switching state, whereby the computer stops the further movement of the support 55 or 55'. When this condition has been reached, the data from the distance measuring device 2 and from the cameras 6 to 9 are supplied to the central processing unit which calculates the wheel diameter and provides output information regarding the quality of the wheel or contour. Further details regarding a distance measuring device are disclosed in our copending application U.S. Ser. No. 893,365 filed simultaneously with the present application. A measuring operation takes place as follows.

All cameras 6 to 9 are energized in synchronism to assure a synchronism in the switching state of all pixels in all cameras. Each camera may be provided with a zoom objective equipped with a blue filter for passing blue light, but filtering out infrared light from the strobe light. In any event, the focal length of the objective must be such that the sensing surface of each camera' in which the pixels are located are completely filled out by reflected light.

Figure 3:
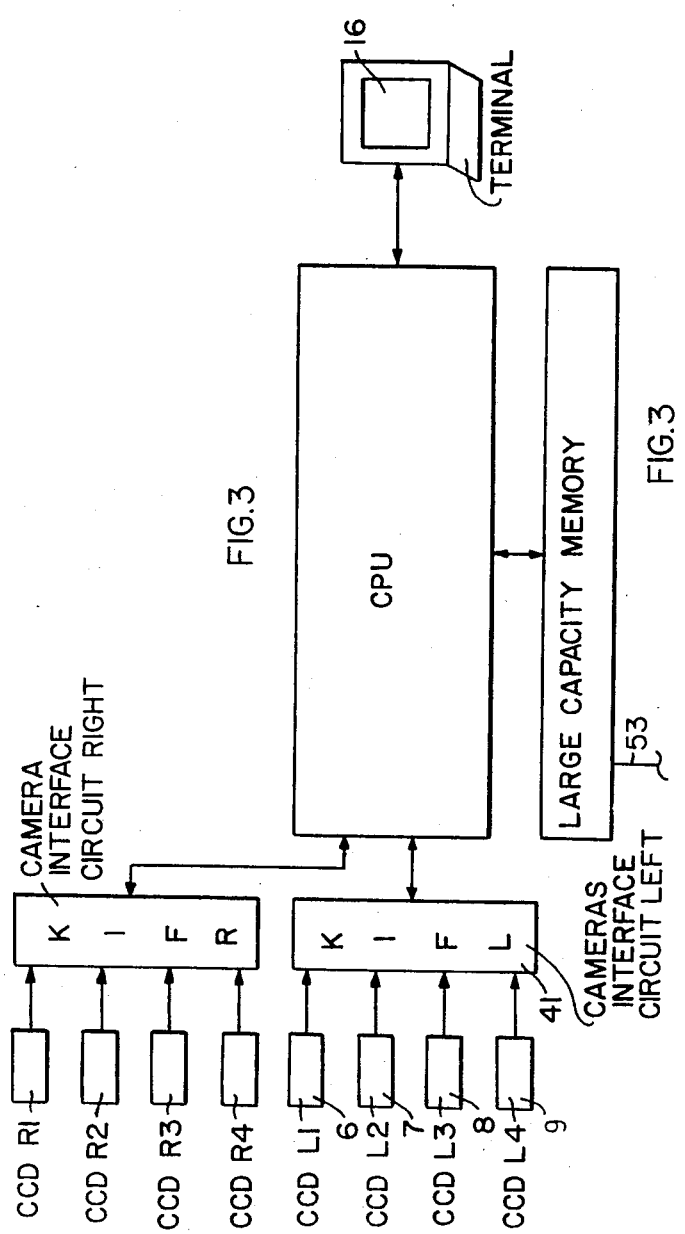
FIG. 3 is a block diagram of the present system showing the central processing unit connected to two sets of cameras for scanning both wheels of a set and showing the camera interface circuits as well as a large capacity memory and an output terminal.

The above mentioned parallel processing of the signals coming from the cameras in the interface circuits 41 shown in FIG. 3 has the advantage that the data handling capacity of the main or central processing unit can be reduced. This preliminary signal processing also makes it possible to use any number of cameras for an increased resolution. The preliminary signal processing in the signals 41 separates the synchronous component of the video signal for forming with the aid of a self-regulated threshold circuit a binary image from the gray image. The black and white transition in each binary image is then sensed for detecting the profile or contour of the wheel. The respective signal value constitutes a coordinate value within the coordinate system of FIG. 6 and is stored in the large capacity memory of the central processing unit. This preliminary processing requires about 40 milliseconds and takes place in parallel and synchronously so that at the end of this preliminary processing a complete profile line is available as a set of data which are transferred or read into the central processing unit which then may perform the necessary functions to display a profile line 50 on a coordinate image screen 16 of an output terminal as shown in FIG. 3.

Figure 6:
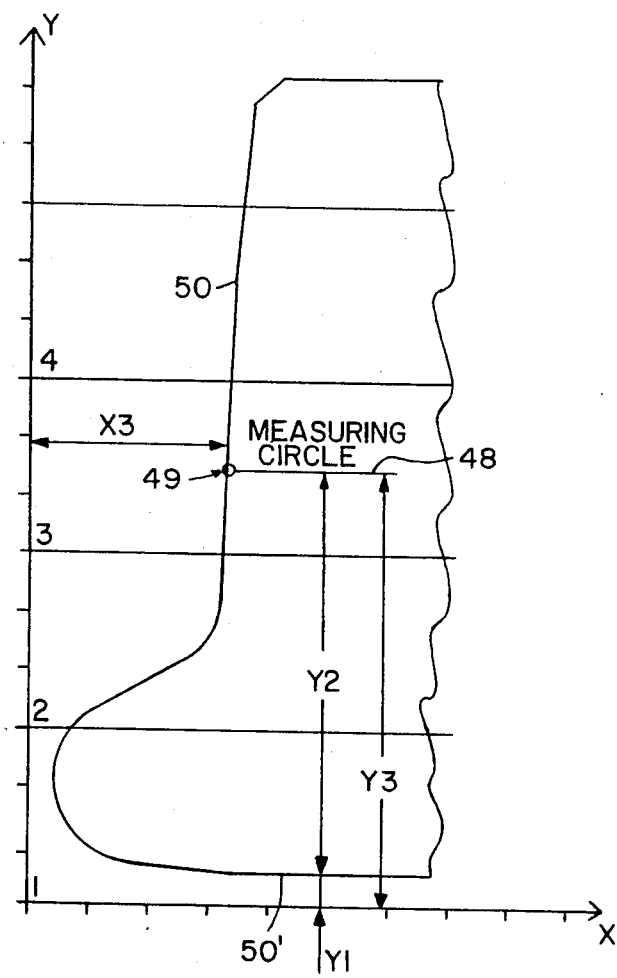
FIG. 6 is a diagram for facilitating the explanation of the data processing and data evaluation according to the invention in the central processing unit.

Referring further to FIG. 6, the profile line 50 can be placed in a definite position by the computer due to the definition of the measuring circle 48 passing through a point 49 on the circumferential surface of the wheel profile 50. The distance Y2 in the direction of the ordinate Y is fixed by the physical dimensions of the wheel and corresponds to the spacing between the point 49 and the facing surface 50' of the wheel. The computer is capable to determine the spacing Y1 on the basis of coordinate data stored in the computer. The spacing Y1 is the distance of the wheel facing surface 50' from the abscissa X. Thus, the computer will add Y1 to Y2 to determine Y3 which is the Y coordinate of the measuring point 49. The coordinate X3 is also known to completely define the location of the point 49. The computer is now capable to place a rated profile in its internal coordinate system in such a way that the point 49 of the rated profile coincides with the point 49 of the measured profile. Any deviations from the rated profile by the measured profile along the individual points of the profile line 50 are then easily ascertained and displayed on the image screen 16, for example. Similarly, the measured profile could be printed out by a plotter or stored on a tape for controlling a truing machine.

As mentioned above, a single illuminating device 5 with its optical means can be used to illuminate, or rather provide reflected light to several arrays of sensor or scanning cameras, all of which are connected to a common driving electronic circuit which may be located separate from the sensing cameras, but connected to the cameras by an electronic link. If charge coupled devices are used as the cameras, the conversion of the analog signals representing the wheel profile or contour, into digital signals by separate analog-to-digital converters is not necessary because arrays of these charge coupled devices by their nature provide a digital output signal.

By the above described increasing of the measuring point 3 into a measuring zone 11 it is possible to improve the light output or efficiency even if the wheel circumferential surface does not completely reflect diffuse light. This improvement in the light output is possible by the selection of the proper angle $\alpha$ smaller than 90°, but larger than 60°, about.

By using the above described interpolation between two images produced with an illumination as disclosed in FIG. 4, it is possible to compensate any errors in the positioning of the wheel. The taking of a plurality of pictures or images in a rapid sequence has the advantage that profile images with the least distortion can be selected and extrapolated if necessary. Similarly, an interpolation between two profiles of the least distortion can be made. This taking of a multiplicity of images can be done where a light section illumination is employed to provide a double illumination as shown in FIG. 4 on both sides of a wheel or it may be used when only one of the light sources on one side of a wheel in FIG. 4 is used. This multiple exposure can also be used where a light edge illumination is employed and only one set of cameras is used on one side of the plane in which the direction 19 is located as shown in FIG. 1 for example. By evaluating the degree of distortion of the several images, the central processing unit is capable of making conclusions regarding the preciseness of the wheel position relative to the measuring position 3. As a result, that image that represents the best position or rather the best coincidence between a spot on the wheel surface and the measuring point 3 is then taken for evaluation or interpolation.

By bringing the rotational axis 1' of a wheel or wheel set into a defined position by the means described with reference to FIG. 5, it is possible to also measure the wheel diameter in addition to ascertaining the profile quality.

By taking pictures or images in response to a rapid exposure sequence which is at least possible where a light section illumination is used, it becomes possible to obtain two clearly defined lines on the camera sensing surfaces and to more precisely select the correct position of the wheel to be measured. As mentioned, this rapid multiple exposure is possible in connection with a light intersection illumination because this type of illumination produces a light contour line and not a line constituting a dark/bright contrast.

By properly centering the illuminating device and/or the cameras 6 to 9 relative to the wheel or vice versa, it is possible to assure that the wheel surface is in the proper measuring position 3 at the time of exposure, for example by a strobe light.

The adjustment features of FIG. 2 permit varying the intersection between the direction 19 and the direction 26 for taking a certain radius into account, for example, with regard to the type of wheel to be measured.

The present system is capable of measuring a single wheel or all the wheels of a train passing through the measuring range. In any of the embodiments it is possible to either illuminate the wheel by a strobe light or by a continuous light. In the latter case the cameras are activated for the image taking when a wheel is in the measuring position 3. The above described sensors such as rail switches, are suitable for activating the cameras.

By directing the light direction 19 at an acute angle α as shown in FIG. 2, the requirements as to the highly precise positioning of the wheel at the instant of exposure may be somewhat relaxed. By placing all the measuring components and illuminating light source or sources on a carriage as shown in FIG. 5, the system can be moved along with a train or it may be brought into cooperation with a wheel of a stationary train. When the train is stationary, the wheel 1 would have to be rotated, whereby the rotatable rollers 23 permit such rotation. In any event, wheels of different diameters can be measured due to the adjustments provided in FIG. 5 or in FIG. 2. These adjustments also permit placing the camera where it is structurally most convenient. By using the beam splitter 20 the arrangement of the cameras can be more compact or more cameras can be used to obtain a better resolution. Incidentally, by keeping the angle α within the range of about 60° to 90° it has been found that any profile distortions are easily corrected. By adjusting the position of the camera and light source in response to the wheel diameter as described, for example with reference to FIG. 2, it is possible to adjust the whole apparatus to different wheel diameters provided that the light source or rather, the direction 19 does not extend vertically upwardly. By building the 1 in the direction 26 through light conductors, it becomes possible to further increase the number of cameras for an improved resolution.

Figure 8:
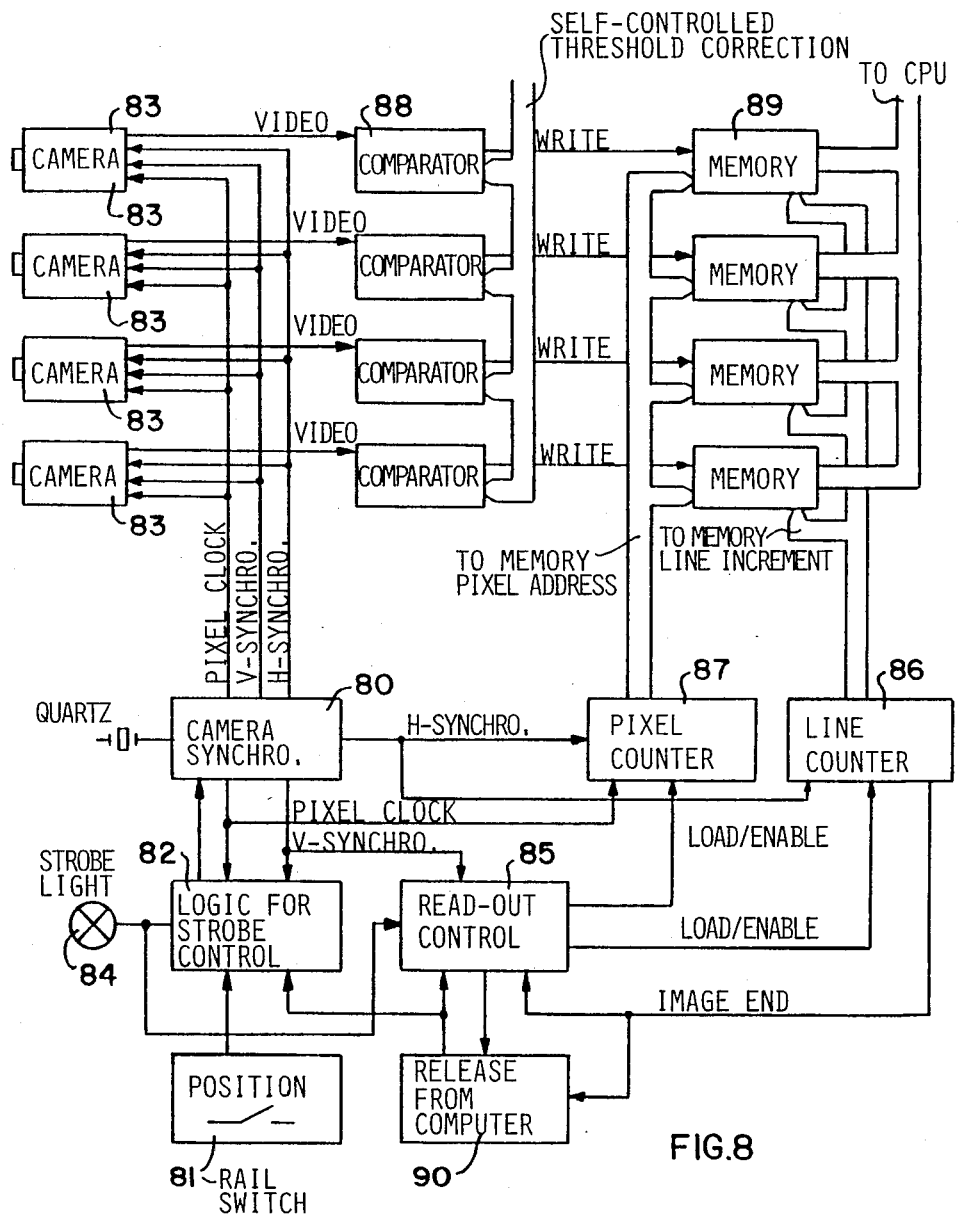
FIG. 8 is a block diagram for the signal processing in a system according to the invention.

The evaluation of wheel tread images which are taken by means of electronic cameras will now be described with reference to FIG. 8.

(1) When the system is switched on, the camera synchronization 80 is continuously operational.

(2) When a wheel arrives, the rail switch 81 signals the presence of a wheel in the measuring position to the logic circuit for the strobe control.

(3) The logic circuit 81 for the strobe control makes, through the camera synchronization 80, the electronic camera 83 ready to take pictures.

(4) After the electronic camera 83 have sent, through the camera synchronization 80, a return signal to the logic circuit 82 for the strobe control, the latter triggers a flash or strobe 84.

(5) The flash or strobe 84 generates in the electronic camera 4, through the optical means of the camera, a charge image of the illuminated wheel tread surface, for example, on a CCD-array.

(6) Upon completion of taking the charge image the read-out of the image information may begin.

(7) For this purpose the read-out control 85, subsequent to the next vertical synchronization impulse of the camera synchronization 80, preadjusts the line counter 86 in accordance with the number of lines of the image and the pixel counter 87 in accordance with the pixel number of an image line.

(8) The camera synchronization 80 produces a pixel clock signal supplied (a) to the electronic camera 4 to cause a linewise scanning of the charge image for producing the video signal, and supplied (b) as a count impulse for producing a digital information for the image content (see step number 12 below) in accordance with the respective count in the pixel counter 87.

(9) The H-synchronization (Horizontal synchronization) caused by the camera synchronization 80 is supplied to:
(a) the electronic cameras 83 to cause the scanning of the respective next image line,
(b) line counter 86 as a counting impulse to form the storage addresses for the image content (step see 12 below) corresponding to the respective count, and
(c) as a reset and loading instruction to the pixel counter 87.

(10) The V-synchronization (Vertical synchronization) produced by the cameras synchronization 80 is supplied to:
(a) the electronic camera to cause the dark switching for the image return run,
(b) the strobe control 82 as a release signal for the next image taking, and
(c) the read-out control 85 as a start triggering signal.

(11) The video signal from the cameras 83 is supplied to the preliminary processing in the comparator 88. The comparators 88 performs the following steps:
(a) analog signal processing, for example amplification, black value fixation,
(b) separating the H and V-synchronizing signals from the video signal so that an image content signal remains,
(c) producing a binary (black/white) signal from the image content signal (gray image) by comparing with a self-controlling threshhold (comparator).

(12) For each image line the comparator 88 supplies a write instruction to the buffer memory 89 in response to a black-white transition providing a respective status change comparator output signal, whereby the buffer memory 89 stores the instantaneous contents of the pixel counter 89 at the address defined by the line counter 86.

(13) Thus, the time of an image end of the location of the black-white transition for each image line is stored as a numerical value in the buffer memory 89. The central processing computer receives a release 90 and can interrogate the buffer memory for evaluating the image content.

(14) If, for the above stated reasons several, for example four, electronic cameras are used, the number of the comparators as well as of the buffer memories 89 increases respectively. The processing of the video signals in accordance with steps 11), (12), and (13) takes place in parallel, that is, simultaneously. The access of the controlling central processing computer to content.

What we claim is :

1. A method for measuring in a contactless manner the tread quality of a circumferential tread surface of a railroad wheel having a rotational axis, comprising the following steps:
(a) illuminating the circumferential tread surface of said railroad wheel by directing light in an approximately radial direction onto said circumferential tread surface for producing a light section image of said wheel circumferential tread surface, said light section image extending substantially in parallel to said rotational axis of said railroad wheel, (b) sensing said light section image for producing electrical analog signals representing said tread quality, (c) digitizing said electrical analog signals for producing digital signals representing said tread quality, and (d) evaluating said digital signals for providing information output signals representing said tread quality.

2. The method of claim 1, further comprising moving said railroad wheel through a measuring range in which said illuminating step and said sensing step are performed.

3. The method of claim 2, wherein said wheel moves in a movement direction defined by said measuring range and wherein said illuminating approximately radial direction extends at an acute angle (? 1) to said movement direction.

4. The method of claim 2, wherein said wheel moves in a movement direction defined by said measuring range, and wherein said illuminating approximately radial direction extends at a right angle ($\alpha$ 2) to said movement direction.

5. The method of claim 4, wherein said sensing of said light section image is performed on at least one side of a radial wheel plane.

6. The method of claim 1, wherein said sensing is performed by taking a plurality of light section images in rapid succession to form a respective plurality of analog signals, said digitizing being performed individually for each of said plurality of analog signals, and selecting that digitized signal which has the least distortion among said plurality of light section images.

7. The method of claim 6, further comprising extrapolating from said plurality of analog signals a light section image having the least distortion.

8. The method of claim 6, further comprising selecting from said plurality of light section images two profile images having the two lowest distortions and then interpolating a light section image from said two selected profile images.

9. The method of claim 1, further comprising bringing said rotational axis of said wheel and an imaging plane of said sensing into a defined position relative to each other, performing said sensing step for each wheel in said defined position, ascertaining the location of any wheel profile in said image plane, and determining a wheel diameter with the aid of said ascertained wheel profile location.

10. The method of claim 1, wherein sensing is performed by sequentially taking at least two pictures of said light section image prior to said digitizing, and then using signals representing both pictures in said evaluating.

11. The method of claim 10, further comprising providing a light source for said illuminating and optical sensor means for said sensing, centering said light source and said optical sensor means relative to said rotational axis, and performing said sensing while said light source and said optical sensor means are centered.

12. The method of claim 11, wherein said centering is performed at least temporarily so that said light source and optical sensor means are centered while said sensing takes place.

13. The method of claim 1, wherein said illuminating is performed by two light sources arranged in a plane extending vertically and axially through said rotational axis and axially displaced relative to said rotational axis, so that one light source is located on each side of the wheel.

14. An apparatus for measuring in a contactless manner, the tread quality of a circumferential tread surface of a railroad wheel or wheels having a rotational axis, comprising wheel support means for carrying a wheel set, means for illuminating a portion of the circumferential tread surface of said railroad wheel in an approximately radial direction for forming and reflecting a light section image of said circumferential tread surface, means for sensing said light section image for producing electrical analog signals representing said tread quality, signals digitizing means connected to receive said analog signals for producing digital signals representing said tread quality and means connected to said digitizing means for receiving and evaluating said digital signals for producing output signals providing information regarding said tread quality.

15. The apparatus of claim 14, further comprising mounting means for said illuminating means and for said sensing means for adjusting the position of said illuminating means and of said sensing means relative to said circumferential tread surface, said illuminating means having a first axis directed toward said wheel, said sensing means having a second axis directed to said wheel, said first and second axes enclosing an angle ($\alpha,\beta$) which is within the range of about 60° to about 90°.

16. The apparatus of claim 14, wherein said wheel support means comprise center pins for rotatably supporting said wheel or wheels, wherein said illuminating means comprise light source means for producing said light section image, wherein said sensing means comprise optical camera means for taking pictures of said light section image and means for providing a relative movement between said wheel or wheels and said light source means approximately in a radial direction of said wheel or wheels.

17. The apparatus of claim 16, wherein said light source means have a first optical axis, wherein said optical camera means have a second optical axis, and means for adjusting said optical camera means or said light source means in such a way that the location of an intersection of said first and second optical axes is changeable.

18. The apparatus of claim 14, further comprising distance measuring means (52) for producing distance representing electrical signals for measuring the size of a relative motion between a wheel and said sensing means, and means for supplying said distance representing signals to said signal evaluating means for producing a distance information.

19. The apparatus of claim 14, wherein said wheel support means comprise auxiliary rail means forming a rolling plane (10) for said wheel or wheels, said illuminating means being arranged below said rolling plane for producing said light section image on said circumferential tread surface of a wheel, said sensing means comprising camera means also located below said roling plane (10) for taking pictures of said light section image, and means for ascertaining the arrival of a wheel in a location where light of said illuminating means contacts said wheel circumferential tread surface for providing a starting signal for said apparatus.

20. The apparatus of claim 14, wherein said sensing means comprise an electronic camera and wherein said digitizing means are part of said electronic camera, whereby said electronic camera provides said digital signals at its output.

21. The apparatus of claim 14, wherein said illuminating means comprise light source means having a light projecting direction, said wheel or wheels moving in a given advance direction, said light source means being arranged so that said light projecting direction and said advance direction enclose an acute angle.

22. The apparatus of claim 14, further comprising carrier means (18) for adjustably mounting said illuminating means and for adjustably mounting said sensing means, and means connected to said carrier means for adjusting the position of said carrier means relative to said wheel support means.

23. The apparatus of claim 22, further comprising carriage means on which said carrier means are mounted for displacing said illuminating means and said sensing means relative to said wheel or wheel set.

24. The apparatus of claim 14, further comprising means for mounting said illuminating means vertically below said wheel or wheels, whereby an illuminating beam may be directed vertically upwardly against a wheel circumferential surface.

25. The apparatus of claim 23, wherein said mounting means for said illuminating means comprise a carriage (34), said illuminating means comprising a light source mounted on said carriage (34) for directing a light beam (19) vertically upwardly against said wheel circumferential surface, said sensing means comprising at least two cameras, one of which is located on each side of said light beam (19) in a wheel movement direction for providing said analog signals.

26. The apparatus of claim 14, wherein said illuminating means comprise a light source, wherein said sensing means comprise a plurality of cameras for sensing a wheel profile image produced by said light source, said plurality of cameras being arranged in two groups, one camera group directly receiving light reflected by a wheel circumferential tread surface, said apparatus further comprising light deflecting means (20) for deflecting light reflected by said wheel circumferential tread surface to said second group of cameras.

27. The apparatus of claim 26, wherein all cameras are mounted in a stationary position below a plane (10) on which said wheels roll or move.

28. The apparatus of claim 14, wherein said wheel support means comprise a pair of wheel support rollers for each wheel, cradle means for rotatably mounting said wheel support rollers, drive means connected to said cradle means for positioning said cradle means and thus said wheel support rollers at least vertically relative to said wheel, frame means and means for mounting said cradle means, said illuminating means, and said sensing means on said frame means.

29. The apparatus of claim 28, wherein said wheel support means comprise rails defining a longitudinal direction, said frame means comprising carriage means for moving said cradle means along said rails in a said longitudinal direction defined by said rails.

30. The apparatus of claim 14, wherein said illuminating means comprise two light sources arranged in a plane extending vertically axially through a rotational axis of a wheel, said two light sources being axially displaced relative to said rotational axis so that one light source is located on each side of a wheel.

31. The apparatus of claim 14, wherein said sensing means comprise a plurality of cameras, each camera being arranged for sensing or scanning a different portion of said tread wheel circumferential, said means for evaluating said digital signals comprising interface signal processing means connected to said cameras for a preliminary said cameras simultaneously, said signal evaluating means further comprising serially operating signal processing means and memory means connected to said interface signal processing means for temporarily storing said signals processed in parallel fashion, said memory means being further connected to said serially operating signal processing means for transferring signals from said memory means to said serially signal processing means.

32. The apparatus of claim 14, further comprising image preserving light conductor means arranged for transmitting light reflected by said wheel circumferential surface to said sensing means.

33. The apparatus of claim 14, further comprising wheel diameter measuring means for producing a wheel diameter representing signal position adjustable mounting means for mounting said illuminating means and said sensing means, and adjustment drive means cooperating with said position adjustable mounting means for adjusting the position of said sensing means and of said illuminating means in response to said wheel diameter representing signal.

34. The apparatus of claim 14, further comprising means for guiding an illuminating beam to be directed vertically upwardly against a wheel circumferential tread surface.

* * * * *

UNITED STATES PATENT AND TRADEMARK OFFICE
CERTIFICATE OF CORRECTION

PATENT NO. : 4,798,964                Page 1 of 2

DATED : January 17, 1989

INVENTOR(S) : Harald Schmalfuss et al.

It is certified that error appears in the above-identified patent and that said Letters Patent is hereby corrected as shown below:

On the Title Page, Item [54], and Column 1, lines 1-4, the title should read

--METHOD AND APPARATUS FOR THE CONTACTLESS MEASURING OF THE TREAD QUALITY OF RAILROAD WHEELS--;

In [57] Abstract, line 1, replace "tread of" by --tread or--;

Claim 3, line 4, (column 13, line 19), replace "(? 1)" by --($\alpha$ 1)--;

Claim 14, line 11, (column 14, line 15), replace "signals" by --signal--;

Claim 16, line 7, (column 14, line 36), after "image" insert --,--;

Claim 31, line 4, (column 16, line 20), replace "said tread wheel circumferential," by --said wheel circumferential tread surface,--;

Claim 31, line 7, (column 16, line 23), after "preliminary" insert --signal processing in parallel fashion to process all signals from--;

Claim 32, line 4 (column 16, line 35), before "surface" insert --tread--;

UNITED STATES PATENT AND TRADEMARK OFFICE
CERTIFICATE OF CORRECTION

PATENT NO. : 4,798,964

DATED : January 17, 1989

INVENTOR(S) : Harald Schmalfuss et al.

It is certified that error appears in the above-identified patent and that said Letters Patent is hereby corrected as shown below:

Claim 33, line 3, (column 16, line 38), after "signal" insert --,--.

Signed and Sealed this

Thirtieth Day of May, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,798,964

DATED : January 17, 1989

INVENTOR(S) : Harald Schmalfuss, Friedel Sinsel, Hubertus Kurpiella, Ulrich Schondorff It is certified that error appears in the above-indentified patent and that said Letters Patent is hereby corrected as shown below:

TITLE PAGE

In [75] the 4th inventor should be: --Ulrich Schondorff; Erkelenz,--.

Col. 3, line 11, after "camera" insert --.--;

line 66, replace "set and." by --set; and--.

Col. 4, line 33, replace "recited" by --reflected--;

line 52, replace "the" by --be--.

Col. 5, line 22, replace "poses,." by --poses.--;

line 28, after "respective" insert --light section images of the wheel tread--.

Col. 6, line 18, delete "an".

Col. 8, line 2, after "section" insert --image--, delete "or a light edge";

line 61, replace "camera" (2nd occur.) by --cameras--.

Col. 9, line 7, replace "2" by --52--;

line 22, replace "camera'" by --camera--.

Col. 10, line 35, after "employed" insert --as taught herein--;

line 63, replace "intersection" by --section--.

UNITED STATES PATENT AND TRADEMARK OFFICE
CERTIFICATE OF CORRECTION

PATENT NO. : 4,798,964

DATED : January 17, 1989

INVENTOR(S) : Harald Schmalfuss, Friedel Sinsel, Hubertus Kurpiella, Ulrich Schondorff It is certified that error appears in the above-identified patent and that said Letters Patent is hereby corrected as shown below:

Col. 11, line 15, replace "$\alpha$" by --$\alpha 1$--;

line 39, replace "By building the 1" by --By guiding the light--;

line 40, after "conductors," insert --such as light conductor fibers (lcf, Fig. 1a)--;

line 50, after "circuit" insert --82--;

line 55, replace "camera" by --cameras--;

line 60, replace "camera 4" by --cameras 83--.

Col. 12, line 4, replace "camera 4" by --cameras 83--;

line 16, replace "(step see" by --(see step--;

line 29, replace "comparator" by --comparators--;

line 30, replace "performs" by --perform--;

line 44, replace "89" by --87--;

UNITED STATES PATENT AND TRADEMARK OFFICE
CERTIFICATE OF CORRECTION

PATENT NO. : 4,798,964

DATED : January 17, 1989

INVENTOR(S) : Harald Schmalfuss, Friedel Sinsel, Hubertus Kurpiella, Ulrich Schondorff It is certified that error appears in the above-identified patent and that said Letters Patent is hereby corrected as shown below:

Col. 12, line 49, after "release" insert --signal--;

line 56, replace "11)" by --(11)--;

line 58, after "to" insert --the numerical values stored in the buffer memory 89 may take place in a serial manner for evaluating the image--;

following line 58, insert the following paragraph:

--Although the invention has been described with reference to specific example embodiments, it will be appreciated that it is intended to cover all modifications and equivalents within the scope of the appended claims.--.

Signed and Sealed this

Fifteenth Day of November, 1994

Attest:

BRUCE LEHMAN

*Attesting Officer*     *Commissioner of Patents and Trademarks*